Inventor
Carl Morey.
BY
Edward W. Wisart
Attorney.

Jan. 6, 1953     C. MOREY     2,624,244
PLANER HEAD
Filed March 12, 1945     5 Sheets-Sheet 4
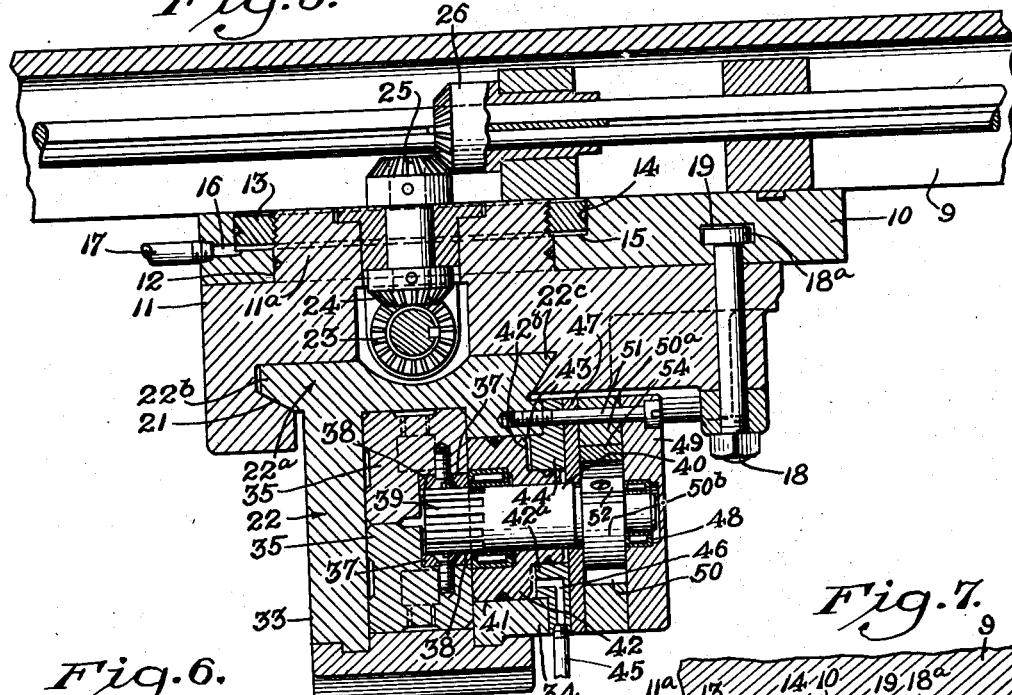
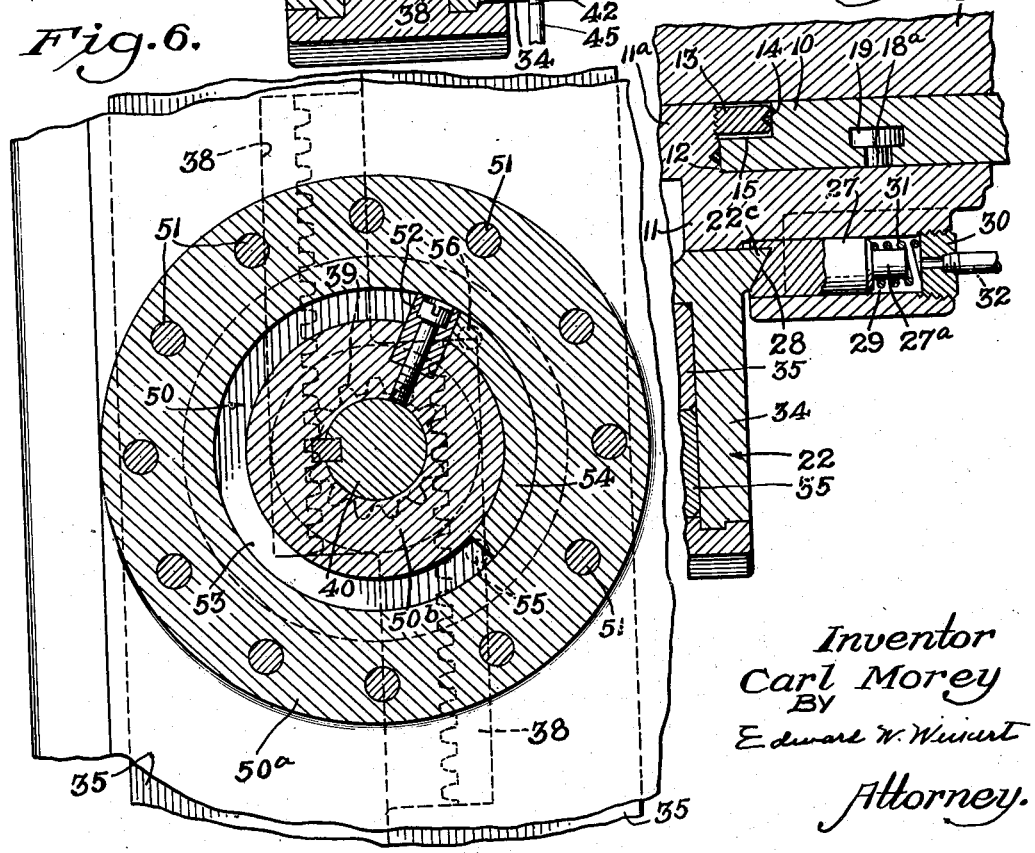
Inventor
Carl Morey
BY
Edward W. Weinert
Attorney.

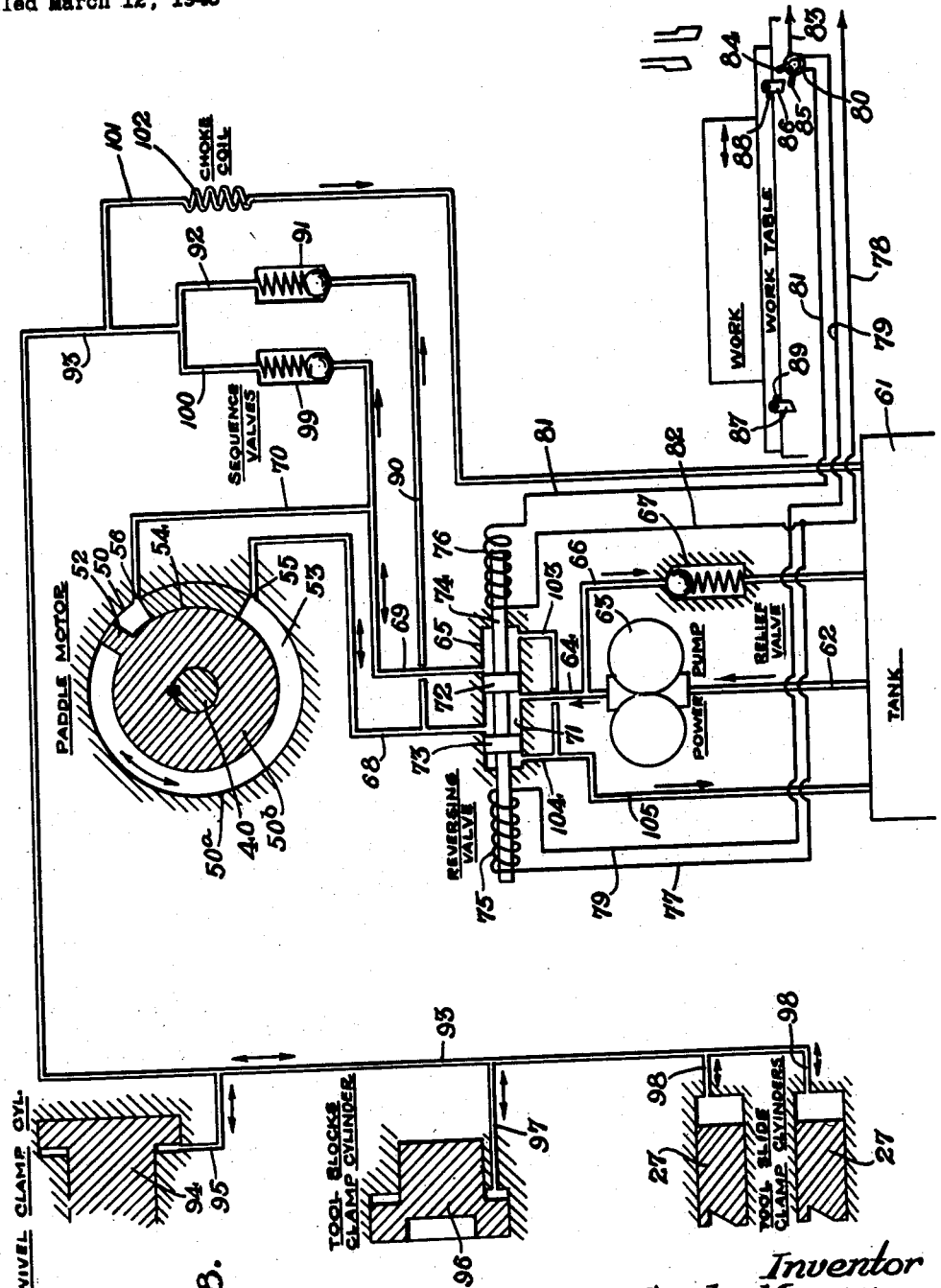

Patented Jan. 6, 1953

2,624,244

UNITED STATES PATENT OFFICE 2,624,244

PLANER HEAD

Carl Morey, Hamilton, Ohio, assignor, by mesne assignments, to Clearing Machine Corporation, a corporation of Illinois Application March 12, 1945, Serial No. 582,337

7 Claims. (Cl. 90—53)

This invention relates to a head for planers, a term which is used broadly to include any metal working machine and concerns itself primarily with means for elevating or lowering one or more tool holders and applying hydraulic or fluid pressure to vital parts for firmly maintaining the same in rigid position and with means for controlling the elevating and fluid pressure means during the operation of the machine, to which the invention may be applied.

The planer head may contain one or two cutting tools; two cutting tools being desirable for cutting upon both strokes of the machine and such a double tool block head has been illustrated.

In cutting in both directions, there is always a strong force acting against the cutting tools which must be rigidly maintained in position during the cutting strokes. This invention provides means for rigidly clamping all vital members to eliminate all operating clearances and to withstand the cutting force during cutting strokes.

The invention comprises the novel structure and combination of parts hereinafter described and more particularly pointed out and defined in the appended claims.

In the accompanying drawings which illustrate a preferred form of this invention, and in which similar reference numerals refer to similar parts in the different views:

Fig. 5 is a sectional view taken upon the line 5—5 of Fig. 1 looking in the direction of the arrows;

Fig. 6 is an enlarged sectional view taken upon the line 6—6 of Fig. 2 looking in the direction of the arrows;

Fig. 7 is a sectional view taken upon the line 7—7 of Fig. 1 looking in the direction of the arrows, and Fig. 8 is a diagrammatic view with parts in section of a fluid circuit involving this invention.

Figure 1:
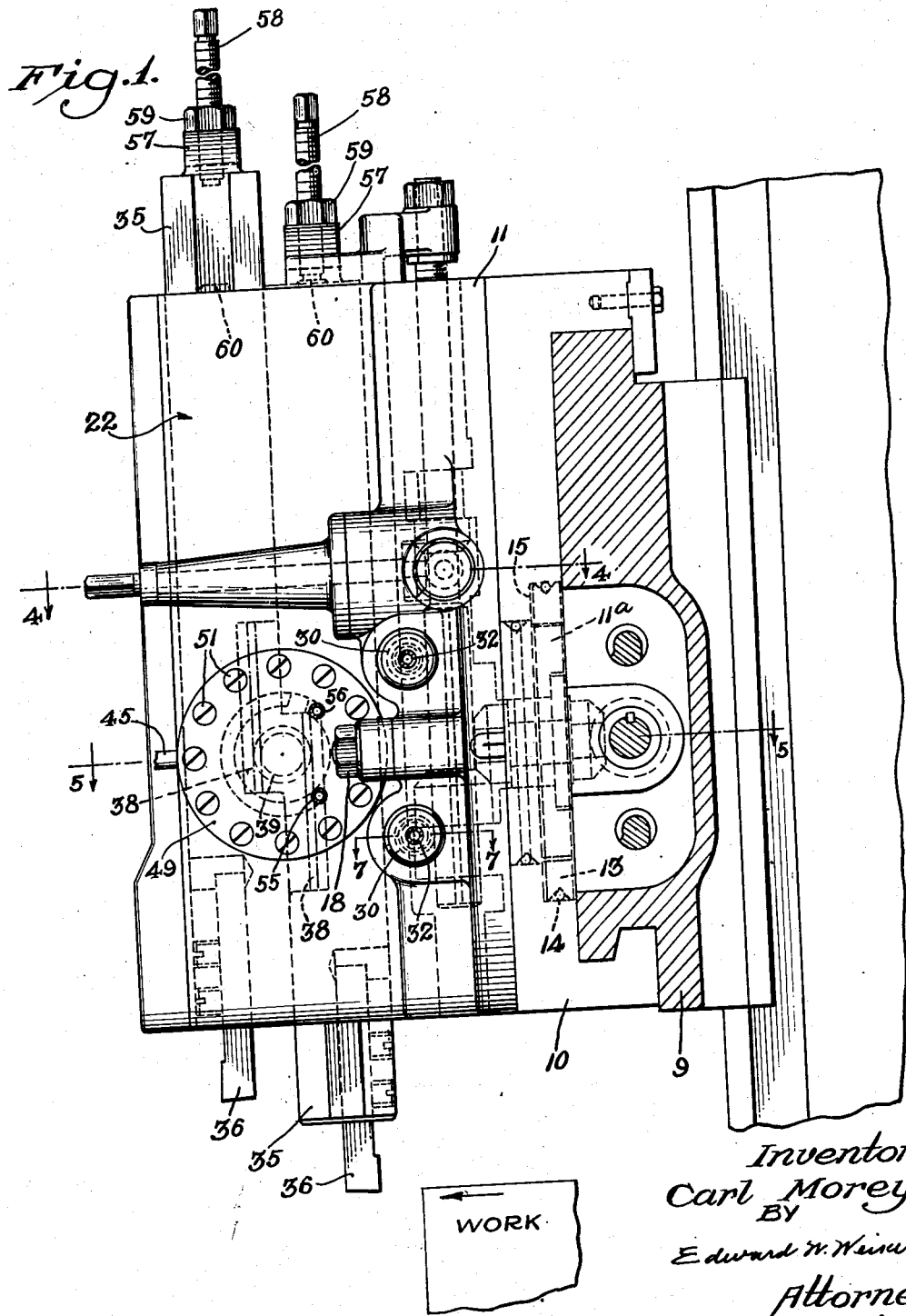
Fig. 1 is a side elevational view of a planer head involving this invention with parts in section.

In referring now to the drawings which illustrate a chosen embodiment of this invention, there is shown a planer head which may be attached to a metal cutting machine known as a planer or may be adapted to any conventional planer. As a matter of illustration, there is shown a cross rail 9 which may be considered a part of any planer. A saddle 10 is secured in any suitable manner to the cross rail 9.

A swivel block 11 best shown in Fig. 5 is provided with a laterally projecting neck portion 11a which extends through a cylindrical aperture 12 in the saddle. A collar 13 is secured around the outer part of the neck, and this collar fits in a rabbet 14 formed in the adjacent face of the saddle adjacent said opening. It will be noted that there is a space 15 between the collar 14 and the opposite face of the rabbet in the saddle for the admission of oil or fluid through a passage 16 in the saddle to which a fluid supply pipe 17 leads. Thus, fluid pressure applied to the inner face of the collar will tend to draw the swivel toward the saddle and firmly clamp the main part of such swivel against the saddle.

Figure 2:
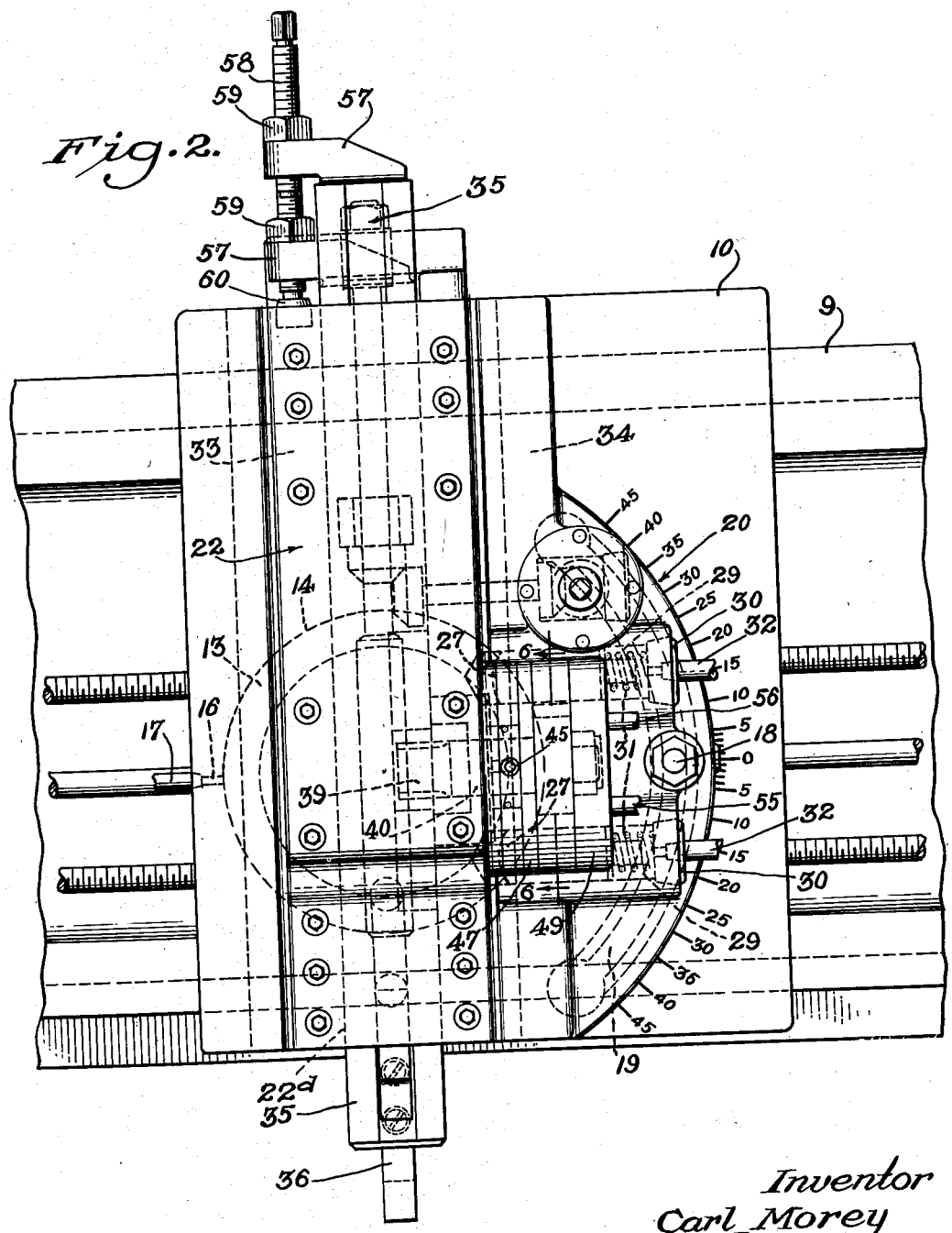
Fig. 2 is a front elevational view of the planer head.

With the exception as noted, the swivel may be of conventional design locked in position by a clamping bolt 18 which has a head 18a movable in an arcuate groove 19 in the saddle which is provided with an arcuate calibrated portion 20 (Fig. 2).

The outer face of the swivel is provided with a guide way 21 (Fig. 5) for the tool slide 22 which is provided with a head 22a having conical side flanges 22b and 22c which fit in under cut portions of the guide way. This slide may be regulated with respect to the work by the usual system of power gearing 23, 24, 25 and 26, or by hand operated means as is well known.

Fluid operated means has been provided for locking the slide rigidly in position during the cutting stroke. In the illustrated embodiment of this invention, this fluid operated means is shown as being in the form of fluid operated pistons 27 one of which is shown in detail in Fig. 7, and the other in dotted lines in Fig. 3. These fluid operated pistons are shown as engaging the flange 22c on the slide, and as being suitably notched in their forward ends as indicated at 28 to fit the flange. The pistons are mounted in suitable fluid chambers 29 formed in the swivel 11 and which are closed at their outer ends by screw plugs 30. A coil spring 31 is positioned between the rear end of each piston and plug 30; the spring being preferably mounted on a reduced tail piece 27a on the rear of the piston which is in spaced relation to the plug to allow suitable movement to the piston. The springs serve to press the pistons against the flange 22b. The chambers 29 are adapted to be supplied with fluid under pressure through fluid inlet pipes 32 during the cutting strokes as will later more fully appear.

It will be noted, especially in Fig. 5, that the tool slide is a bifurcated member comprising two spaced walls 33 and 34 between which two tool holding blocks or tool holders 35 are mounted side by side for alternate up and down movement. These tool holders extend vertically, one directly behind the other when viewed from the front of the machine. The tool holders 35 carry tools 36 at their lower ends with the cutting edges facing in opposite directions for cutting in both directions of movement of the work. The bifurcation is closed by a plate or member 22d bolted to the ends of the walls 33 and 34.

Mechanism has been provided for automatically raising one tool holder and lowering the other at the end of a stroke. This mechanism in addition to a fluid or hydraulic system includes mechanical elements associated with the tool holders which will now be described. Rabbets 37 are formed in the adjacent faces of the tool blocks 35 intermediate the ends thereof. Opposed rack plates 38 are secured to the blocks 35 in the rabbets and these rack plates 38 engage a gear or cog wheel 39 formed or applied upon the end portion of a shaft 40 extending through the wall 34 of the tool slide which is provided with a suitable opening 41 for this purpose.

The shaft 40 is suitably journalled in a tool block clamp piston 42 surrounding the shaft within the aperture 41 in the wall 34 of the tool slide. This piston 42 is mounted for slight longitudinal movement upon the shaft through fluid pressure applied to its outer face. The piston 42 has an annular rabbet 43 adjacent its outer end. An apertured plate 44 attached to the outer face of the tool slide surrounds the reduced portion or hub of the piston 42 and is provided with a boss 42a extending into the aperture in the wall 34 to a point slightly spaced from the main portion of the piston to provide a fluid space or chamber 42b between such boss and the main part of the piston. A fluid pipe or hose 45 is connected with the plate 44 and a fluid passage 46 extends from the pipe 45 through the boss 42a of plate 44 to the fluid chamber 42b.

An apertured plate 47 surrounds the shaft 40 and is secured against the outer face of the plate 44. The shaft 40 is reduced beyond the plate 47 and extends into a bearing 48 carried by an end plate 49 spaced from the plate 47. A paddle motor generally denoted by the reference 50 is mounted upon the shaft 40 between the plates 47 and 49 for operating shaft 40 as will later more fully appear. Screw bolts 51 extend through plate 49, the stationary cylinder 50a of the paddle motor, the plates 47 and 44, and into the tool slide for securing these parts in place.

The paddle motor in addition to the stationary cylinder 50a involves a rotor 50b (Fig. 6) keyed upon the shaft 40 and a paddle 52 secured upon the rotor and engaging the inner surface of the cylinder 50a. There is an annular space 53 between the rotor and cylinder which is obstructed for a distance by an arcuate filler block 54 located between the fluid inlets 55 and 56 to said space. Fluid acting first on one side of the paddle, and then upon the other side will cause the required oscillation of shaft 40 for operating the tool holders as will later more fully appear.

Figure 3:
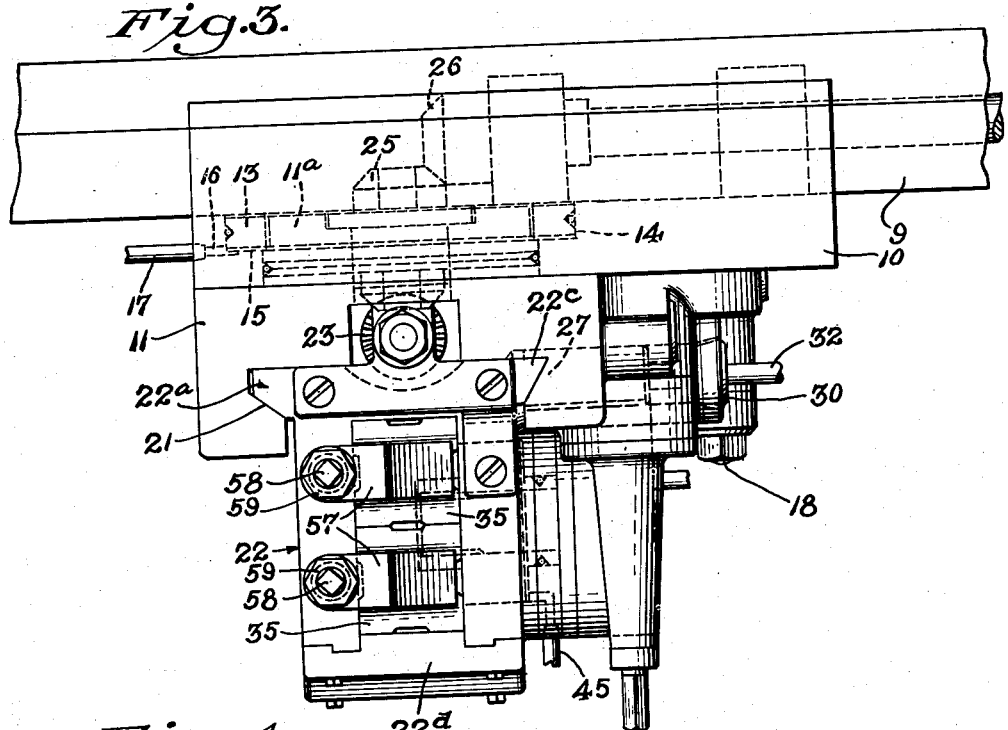
Fig. 3 is a top plan view of the planer head.
Figure 4:
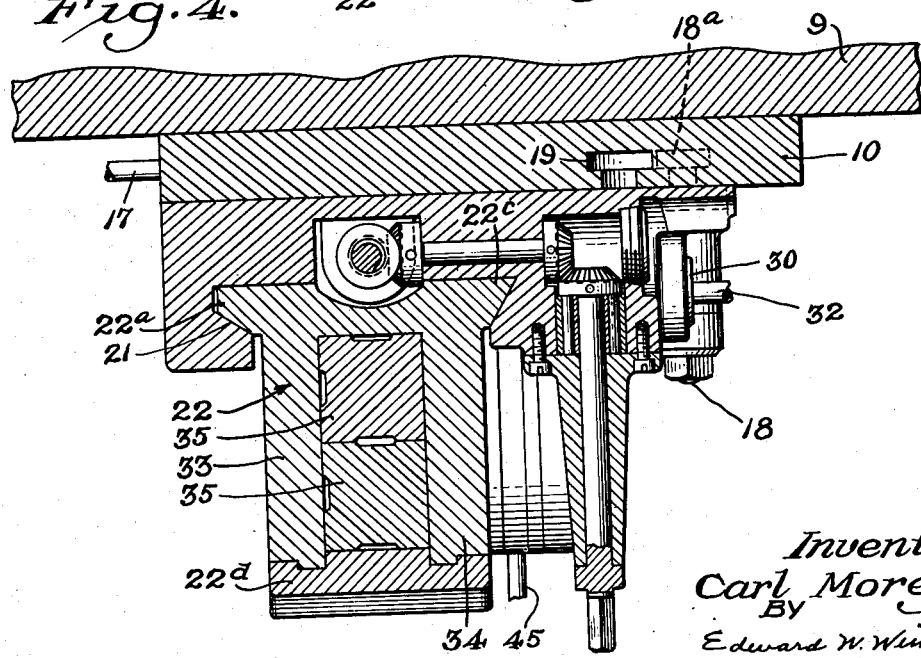
Fig. 4 is a sectional view taken upon the line 4—4 of Fig. 1 looking in the direction of the arrows.

With reference to Figs. 1, 2 and 3, it will be noted that the tool holders or blocks 35 extend considerably above the tool slide. Each tool block 35 has fixed to its upper end an arm 57 which carries an adjustable stop screw 58 held in place by a lock nut 59 and which is adapted for engaging a hardened steel button 60 upon the top of the tool slide to register the tool in proper position for its cutting stroke.

In Fig. 8, there is shown a hydraulic or fluid pressure system for operating the paddle motor and the different clamping cylinders and parts. In this system, there is an oil or fluid tank 61 which is connected by a fluid feed pipe 62 to a power pump 63 which discharges through a pipe 64 leading to a reversing valve 65. The discharge pipe 64 is connected by a return pipe 66 to the tank 61. A relief valve 67 in the pipe 66 protects the pump against overload as is well known.

The reversing valve 65 is connected by a fluid flow pipe 68 with the fluid inlet 55 of the paddle motor and is connected by pipes 69 and 70 with the fluid inlet 56 of the paddle motor. In practice, the pipes may consist of flexible hose.

The reversing valve consists of a cylinder 71 containing two valve heads 72 and 73 fastened upon a rod 74 slidably extending through the cylinder or valve housing. The rod 74 is adapted to be alternately shifted in opposite directions by electric means which may be in the form of solenoids 75 and 76 surrounding the extended end portions of the valve rod 74. The solenoid 75 is connected at one end by a conductor 77 and 78 with a source of energy, and is connected at its other end by a conductor 79 with a trip or snap switch 80.

The solenoid 76 is connected at one end by a conductor 81 with the switch 80 and is connected at its other end by means of a conductor 82 with the conductor 78 which extends to the source of energy. The switch 80 is connected by a conductor 83 with the said source of energy.

The movable switch members which may be of suitable arcuate parts to form the desired connections between the contact points may be provided with two trip arms 84 and 85 which are adapted to be tripped by lugs 86 and 87, pivoted to the work table; a pin 88 projects from the work table against the left hand side of lug 86 while a pin 89 projects from said table against the right hand side of lug 87. With this construction, the lug 86 will trip the switch when moving toward the right and will ride thereover when moving to the left, while the lug 87 will function vice versa. The switch is so constructed that when either of the lugs trips the switch the circuit through one solenoid is completed, and the circuit through the other solenoid is broken in the manner of a two way switch.

The fluid system is so arranged that fluid pressure is applied to the swivel clamp, the tool block cylinder and the tool slide cylinders during both the forward and rearward cutting strokes. To this end, there extends a fluid flow pipe 90 from the pipe 68 that connects with a sequence or check valve 91 and which in turn is connected by the pipes 92 and 93 with the swivel clamp 94 by pipe 95, with the tool block clamp cylinder 96 by a short pipe 97 and with the tool slide clamp cylinder 27 by the pipes 98. The pipe 69 extends to a sequence or check valve 99 which is connected through pipe 100 with the feed pipe 93. The check valves 91 and 99 including their springs are of sufficient resistance to prevent their being opened by the actuating pressure required to actuate the paddle motor. However, when the tool blocks have been actuated by the paddle motor, the fluid pressure will build up to a point where valve 91 or 99 will be opened to allow the fluid to apply the clamping pistons.

The pipe 93 is connected with a pipe or hose 101 that extends into the fluid tank 61 for returning excess fluid thereto. This pipe 101 includes a choke coil 102 which permits a restricted flow of oil to the tank 61 during the time that the various clamps are functioning and pressure is maintained in the line 93 through the resistance of the choke coil, which may be similar to a capillary tube, but of considerable length to offer proper resistance.

The ends of the reversing valve are respectively connected by pipes 103 and 104 with a pipe 105 leading to the reservoir tank 61 for the escape of air and any fluid that may seep past the valve heads 72 and 73.

In use, the fluid system pump 63 will be in continuous operation and, with the parts in the positions shown in Fig. 8, will force fluid through pipe 64, reversing valve 65 and pipe 68 to the left hand side of the paddle motor; the paddle 52 being shown moved to the left; fluid will also pass through pipe 90, valve 91 and pipe 93 to the various clamping pistons 94, 96 and 27 for causing their clamping action after the paddle motor has been actuated. Of course, at this time, one tool will be in cutting position while the other will be in elevated position.

In Fig. 8, the lug 86 on the work table is shown nearing switch arm 84. When the switch is tripped by lug 86, solenoid 75 will become de-energized through the breaking of its circuit while the circuit to solenoid 76 will be energized through the closing of its circuit and draw valve rod 74 to the right for shutting off the flow of oil or fluid through pipe 68 and establishing the flow through pipe 69 and 70 to the right side of the motor for moving the paddle 52 to the left for rotating shaft 40 a small amount, an operation which will elevate the tool that has just been cutting and lower the idle tool to operative or cutting position. In this position of the reversing valve, fluid will also pass through sequence valve 99, pipe 100 and pipe 93 to the various clamping pistons 94, 96 and 27 for causing their clamping action after the paddle motor has been actuated; a restricted flow through the choke coil to the tank 61 taking place.

It will be appreciated that in adjusting the planer head, it may be necessary to have the fluid pipes flexible and extensible such as conventional hose. The term pipe or pipes is hence broadly used to include hose and such.

In use, the choke coil 102 is designed to offer resistance to the flow of fluid, so as to maintain pressure on the swivel clamp cylinder, tool blocks clamp cylinder and tool slide clamp cylinder and to also release pressure on these elements when the paddle motor is carrying out its function, and the sequence valves 91 and 99 are inoperative. It will be noted that these sequence valves remain inoperative until the paddle motor has completed its stroke.

Various important advantages arise from the use of this invention in that the cutting tools are automatically controlled thru hydraulic or fluid pressure which is utilized in connection with clamping means to firmly anchor the swivel block, the tool slide and the tool blocks in rigid positions during the cutting strokes. This will tend to insure more accurate and better work and prolong the life of the machine.

I am aware that many changes may be made and various details of construction varied without departing from the principles of this invention, so I do not propose limiting the patent granted thereon otherwise than necessitated by the appended claims.

I claim as my invention:

1. In a planer, a swivel block having a guide way, a tool slide slidably mounted in said guide way, a fluid actuated piston mounted in said swivel block adjacent said guide way and having engagement with said tool slide for clamping relation therewith, and means for supplying fluid under pressure to said piston.

2. In a planer, a saddle having an aperture, a swivel block having a neck portion extending into said aperture, said saddle having a rabbet surrounding said aperture, a nut secured to the end of said neck and seated in said rabbet, there being a fluid space between said nut and saddle and means for supplying fluid under pressure to said space for drawing said swivel block tightly against said saddle for the purpose set forth.

3. In a planer, a tool slide having a vertical guide way, a pair of tool holders mounted side by side in said guide way, a driving shaft journalled in said tool slide and having a geared relation with both of said tool holders for elevating one while lowering the other, a piston slidably mounted upon said shaft for clamping relation with both tool holders and means for supplying fluid under pressure to said piston under predetermined conditions.

4. In a planer, a tool slide having a vertical guide way, a tool holder slidably mounted in said guide way, a paddle motor mounted in said slide and having a shaft geared to said tool holder for raising and lowering the same, a clamping piston mounted in said tool slide for engaging said tool holder, a fluid pressure system for supplying fluid to said motor, said system having an auxiliary circuit communicating with said piston for supplying fluid to said piston when said tool holder is in operative position.

5. In a planer, a tool slide having a guide way, a tool holder slidably mounted in said guide way, a fluid motor mounted in said tool slide and having a shaft geared to said tool holder, a fluid actuated clamping member slidably mounted upon said shaft for engaging said tool holder and a fluid pressure system having a circuit connected to said motor and an auxiliary circuit communicating with said clamping member for applying fluid pressure to said clamping member when said tool member is in operative position.

6. In a planer, a saddle, a swivel block connected to said saddle, means for adjusting said block with respect to said saddle, means forming a fluid chamber between parts of said saddle and parts of said swivel block and a fluid pressure system having a flow connection with said chamber for supplying fluid to the same and drawing said swivel block tightly against said saddle for the purpose set forth.

7. In a planer, a tool slide having a vertical guide way, a tool holder slidably mounted in said guide way with its ends projecting beyond said slide, an oscillatable shaft having a geared relation with said tool holder for raising and lowering the same, co-acting means between the upper end of said tool holder and said slide for arresting said holder in operative position, a clamping piston mounted in said slide and engaging said tool holder, fluid pressure means for operating said shaft including a fluid pressure system having an auxiliary circuit communicating with said piston for clamping said tool holder in arrested position.

CARL MOREY.

REFERENCES CITED

The following references are of record in the file of this patent:

UNITED STATES PATENTS

| Number | Name | Date |
|---|---|---|
| 274,565 | Creque | Mar. 27, 1883 |
| 318,646 | Neild | May 26, 1885 |
| 479,606 | McIndoe | July 26, 1892 |
| 780,451 | Strehlau | Jan. 17, 1905 |
| 1,231,946 | Schellenbach | July 3, 1917 |
| 1,485,536 | Trosch | Mar. 4, 1924 |
| 1,806,696 | Mesker | May 26, 1931 |
| 1,924,594 | Blood et al. | Aug. 29, 1933 |
| 2,005,018 | West et al. | June 18, 1935 |
| 2,118,021 | Curtis | May 17, 1938 |
| 2,251,016 | Gallimore | July 29, 1941 |
| 2,299,976 | Groene | Oct. 27, 1942 |
| 2,323,694 | Ward et al. | July 6, 1943 |
| 2,355,677 | Ransome | Aug. 15, 1944 |

FOREIGN PATENTS

| Number | Country | Date |
|---|---|---|
| 8,070 | Great Britain | of 1839 |